US008250533B2

(12) United States Patent
Trofin et al.

(10) Patent No.: US 8,250,533 B2
(45) Date of Patent: Aug. 21, 2012

(54) REFLECTION OVER OBJECTS

(75) Inventors: Mircea Trofin, Redmond, WA (US); David M. Kean, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 129 days.

(21) Appl. No.: 12/814,274

(22) Filed: Jun. 11, 2010

(65) Prior Publication Data

US 2011/0307520 A1    Dec. 15, 2011

(51) Int. Cl.
*G06F 9/44* (2006.01)
(52) U.S. Cl. ......................... 717/120; 707/792
(58) Field of Classification Search ........................ None
See application file for complete search history.

(56) References Cited

U.S. PATENT DOCUMENTS

| | | | |
|---|---|---|---|
| 7,493,605 B2 | 2/2009 | Alaluf et al. | |
| 7,734,664 B2* | 6/2010 | Bryant et al. | 707/805 |
| 8,028,239 B1* | 9/2011 | Al-Hilali et al. | 715/762 |
| 8,131,825 B2* | 3/2012 | Nord et al. | 709/219 |
| 2001/0014889 A1* | 8/2001 | Blackman et al. | 707/3 |
| 2003/0110179 A1* | 6/2003 | Barton | 707/101 |
| 2006/0101412 A1 | 5/2006 | Lev et al. | |
| 2006/0288353 A1 | 12/2006 | King et al. | |
| 2008/0052372 A1* | 2/2008 | Weber et al. | 709/217 |
| 2009/0328001 A1 | 12/2009 | Dubinets et al. | |
| 2010/0079460 A1* | 4/2010 | Breeds et al. | 345/440 |
| 2010/0218195 A1* | 8/2010 | Adl-Tabatabai et al. | 718/107 |

OTHER PUBLICATIONS

"Tools for View Generation in Object-Oriented Databases," by Rundensteiner, Elke. In: Proc. of the 2nd Int'l Conf. on Information and Knowledge Mgt. (1993). Available at: ACM.*
"Reflective Middleware Solutions for Context-Aware Applications," by Capra et al. In: Lecture Notes in Computer Science, 2001, vol. 2192/2001, 126-133. Available at: SpringerLink.*
"Exploiting Reflection and Metadata to build Mobile Computing Middleware," by Capra et al. In: Workshop on Mobile Computing Middleware. Co-located with Middleware 2001. Heidelberg, Germany. 2001. Available at: http://discovery.ucl.ac.uk/831/1/4.0__mmc01.pdf.*
Creating and Deleting Managed Objects—Published Date: Nov. 17, 2009 http://developer.apple.com/mac/library/documentation/cocoa/Conceptual/CoreData/Articles/cdCreateMOs.html (4 pages).
Dodge Common Performance Pitfalls to Craft Speedy Applications—Published Date: Jul. 2005 http://msdn.microsoft.com/en-us/magazine/cc163759.aspx (11 pages).
Multiple Managed Object Contexts with Core Data—Published Date: Jul. 9, 2008 http://www.timisted.net/blog/archive/multiple-managed-object-contexts-with-core-data/ (7 pages).

(Continued)

*Primary Examiner* — Neveen Abel Jalil
*Assistant Examiner* — Daniel Kinsaul
(74) *Attorney, Agent, or Firm* — Workman Nydegger

(57) ABSTRACT

Different views on an object that has metadata. For instance, one code segment might have one view of the object and be able to view some of the metadata of that object, while another code segment might have a different view of the object and have a view on a different set of the metadata of that object. This may be done even though the code segments reside in the same application. Thus, each code segment may have a view of the metadata on the object that is most useful for that code segment to use the object without getting confused by metadata that is less or not relevant to the manner in which the code segment is to use the object.

18 Claims, 3 Drawing Sheets

OTHER PUBLICATIONS

C# .Net Tutorial Reflection—Published Date: 2005 http://www.codersource.net/microsoft-net/c-basics-tutorials/c-net-tutorial-reflection.aspx (2 pages).

* cited by examiner

REFLECTION OVER OBJECTS

BACKGROUND

In object-oriented programming, an "object" is a data structure consisting of one or more properties, and zero or more methods along with interactions. Other pieces of software may interact with the object by calling methods of the object, causing the object to execute a procedure or function potentially reading and/or altering one or more of its properties, and afterward potentially sending another message with the results of processing. An "object-oriented program" may be viewed as a collection of interacting objects, each processing data upon receiving a message, and potentially also generating a message for communication to other objects.

Objects may also have metadata, which do not describe properties of the object, but rather assists in the use of the object. For instance, metadata might be read for purposes of displaying members of the object, or persisting the object to a store. When the object is authored, to the extent that the author may think of ways that the object may be used, the author may create the object with appropriate metadata that will assist with the anticipated uses of the object. Should unanticipated uses for the object arise for which additional metadata might be useful, the "TypeDescriptor" framework in .NET allows for flexibly adding metadata to an object.

BRIEF SUMMARY

At least one embodiment described herein relates to the providing of different views on an object that has metadata. For instance, one code segment might have one view of the object and be able to view some of the metadata of that object, while another code segment might have a different view of the object and have a view on a different set of the metadata of that object. This may be done even though the code segments reside in the same application. Thus, each code segment may have a view of the metadata on the object that is most useful for that code segment to use the object without getting confused by metadata that is less or not relevant to the manner in which the code segment is to use the object.

This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the proffering up of different views of an object to different code segments is described. For instance, one code segment might have one view of the object and be able to view some of the metadata of that object, while another code segment might have a different view of the object and have a view on a different set of the metadata of that object. This may be done even though the code segments reside in the same application. Thus, each code segment may have a view of the metadata on the object that is most useful for that code segment to use the object without getting confused by metadata that is less or not relevant to the manner in which the code segment is to use the object. First, some introductory discussion regarding computing systems will be described with respect to FIG. 1. Then, the embodiments in which views of an object are provided will be described with respect to FIGS. 2 and 3.

Figure 1:
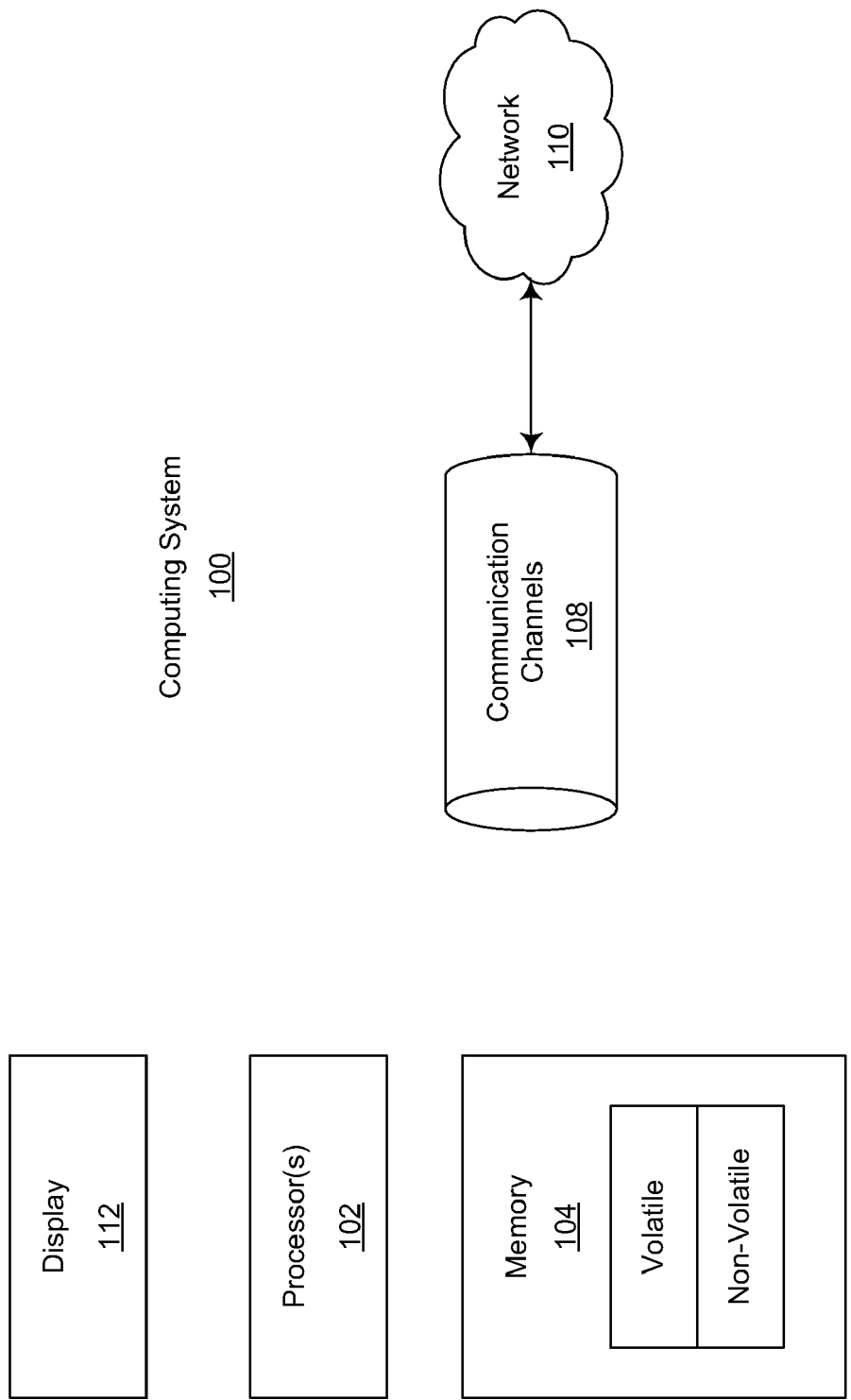
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. The computing system 100 also may include a display 112 that may be used to provide various concrete user interfaces, such as those described herein. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
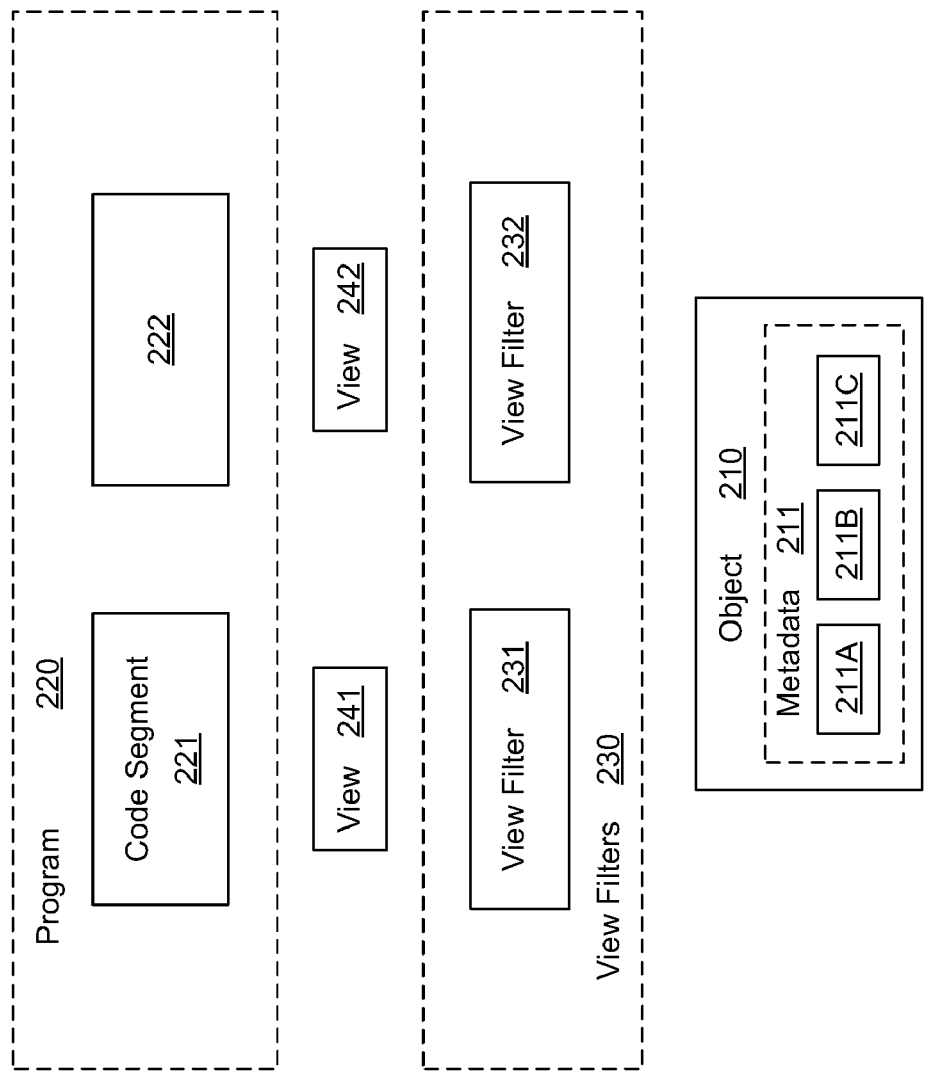
FIG. 2 abstractly illustrates an environment in which multiple code segments access different views on the same object via respective view filters.

FIG. 2 illustrates an execution environment 200 in which a different view of an object 210 is provided to different code segments 221 and 222 of the same program 220. The object 210 is an object in an object-oriented program. Accordingly, the object 210 may include zero or more methods, and one or more properties. The method may be called to thereby cause the object to perform a procedure that may involve read from and/or writing to the properties of the object.

Apart from the properties, the object also includes metadata, which assists in the use of the object. For instance, some metadata may be used to describe how the object should be visualized on a display and/or how the object should be serialized when persisted. In the illustrated embodiment, the object 210 is illustrated as including metadata 211. In this case, three items of metadata 211A, 211B and 211C are illustrated, although the principles described herein are not limited to the type of metadata, nor to the number of metadata items associated with the object. The metadata of the object may also be synthesized at run-time by the corresponding view filter 231 or 232.

Two code segments 221 and 222 have a view on the object metadata 211. The two code segments 221 and 222 may themselves be objects, and may be part of the same computer program 220. A set 230 of one or more view filters provide a view on the metadata 211 of the object. For instance, view filter 231 provides a view 241 of the object 210 to the code segment 221, while the view filter 232 provides a view 242 of the object 210 to the code segment 222. Each of the view filters 230 enforces a particular view on the metadata 211 that is appropriate for their respective code segments. For instance, perhaps one view of the object exposes a different set of metadata (e.g., metadata 211A and 211B) as compared to another view of the object, which exposes another different set of metadata (e.g., metadata 211B and 211C).

In FIG. 2, the view filter 231 is illustrated as providing a view 241 on a single object 210. However, the view filter 231 may provide a view on multiple objects to the code segment 221 or any other code segment. Likewise, the view filter 232 is illustrated as providing a view 242 on a single object 210, but may provide views on multiple objects to the code segment 222 of any other code segment.

Figure 3:
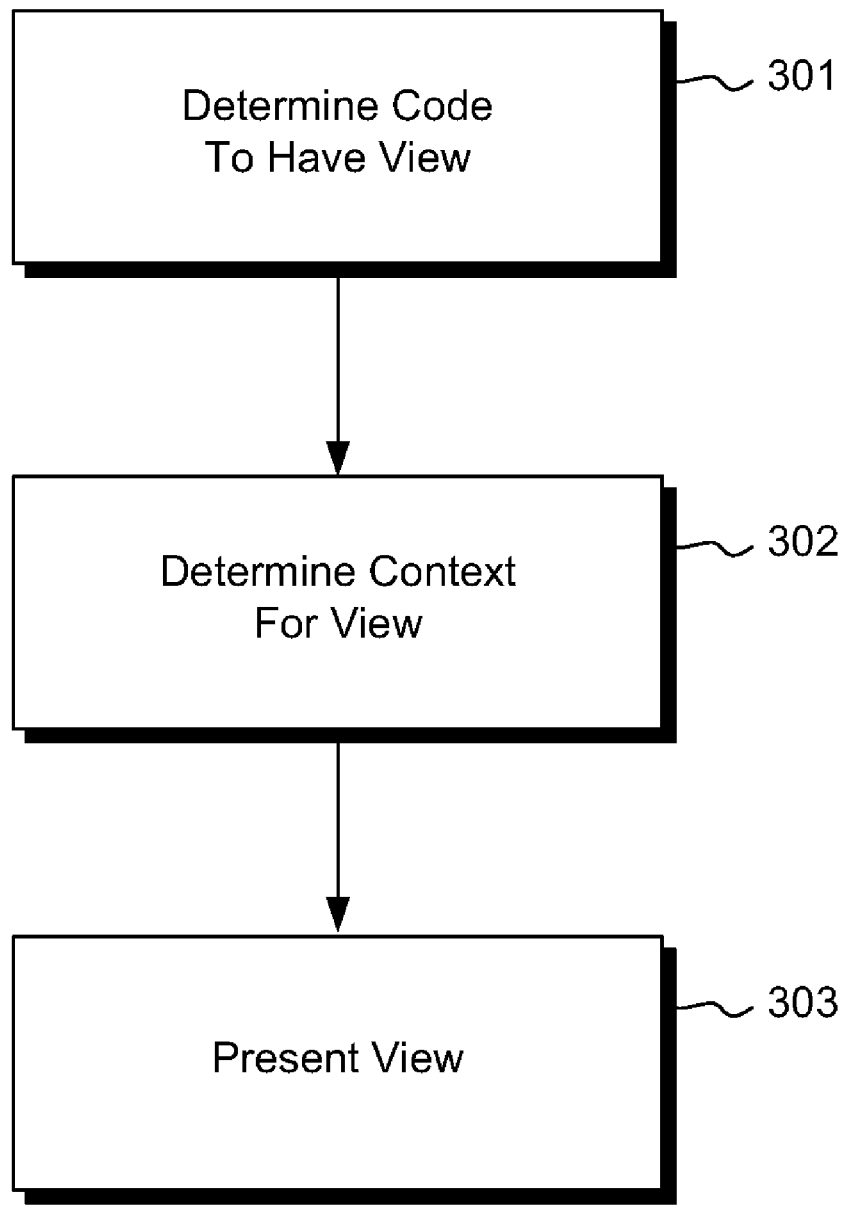
FIG. 3 illustrates a flowchart of a method for presenting a view of an object to a code segment.

FIG. 3 illustrates a flowchart of a method 300 for providing multiple views on an object having metadata. The method 300 may be repeated each time a view of an object is to be provided to a code segment, and may be performed by, for example, the view filters 230. The filter detects that a code segment is to access an object and receive a view on that object (act 301). For instance, the filter 231 may receive a call from the code segment 221 via an application program interface.

The filter then determines a context for the view (act 302), and then provides the view (act 303). For instance, in FIG. 2, the view filter 231 determines the context for the view, and then provides the view to the code segment 221. In one embodiment, the context associated with each view filter is predetermined. Thus, for any possible context, there is an associated view filter. In another embodiment, the view filter may access contextual data associated with the code segment, wherein the contextual data drives the filtering functionality proffered by the view filter.

As an example, the contextual data may affect which of the metadata of the object is made visible to the code segment. For instance, referring to FIG. 2, suppose that metadata 211A of the object 210 is helpful for determining how to render a visualization of the object on a display. Now suppose that metadata 211B of the object is helpful for any usage of the object 210. Finally, suppose that metadata 211C of the object is important for storing the object 210 into a file. Finally, assume that the code segment 221 is to render a visualization of an object on a display, and that code segment 222 function to store the object is a file.

Given this scenario, the contextual data for the view filter 231 may determine that the object view 241 is to only manifest metadata 211A and 211B, and hide metadata 211C. This may be especially helpful if metadata 211C is inconsistent with metadata 211A in a manner that the visibility of the metadata 211C to the code segment 221 could be detrimental to the overall functionality of the code segment 221. Likewise, the contextual data for the view filter 232 may determine that the object view 242 is to only manifest metadata 211B and 211C, and hide metadata 211A. This may be especially helpful if metadata 211A is inconsistent with metadata 211C in a manner that the visibility of the metadata 211A to the code segment 222 could be detrimental to the overall functionality of the code segment 222.

The view filters may enforce consistency when navigating the object. For instance, each accessed objects may have constituent components that are themselves objects. For instance, suppose the object 210 is a person object. A first tier of constituent objects may be a full name object, an age property, and an address property. The full name object may contain a second tier of constituent components including a first name component, a middle name component and a last name component. The address property may also have a second tier of constituent component including a street address object, a town property, a state/province property, a country property, and a postal code property. The street address object may have a third tier of constituent components including a street name property, a street orientation property (e.g., North, East, South, West), and a street number property.

The view filters 231 and 232 may provide different navigation experiences even for the same object. As an example, the level of object navigation may be more or less restricted, and the types of the constituent components may be enforced by the view filter. For instance, in the people object example, the view filter 231 may allow navigation down to the first tier of constituent property of the components. The view filter 231 might proffer up the full name property as a string, the age property as an integer, and the address property as a string. The code segment 221 may have no information whatsoever that the underlying object 210 has further tiers that could be navigated using different views of the object. The view filter 231 may enforce such a view on the object 210 regarding of which code segment access the object through the view filter.

In this same example, the view filter 232 may allow a different navigation experience. Here, perhaps the full name object is not of type string, but is a "full name" object. Furthermore, the first name property, the middle name property, and the last name property are each strings. In this case, the age property might not be an integer, but rather a string. Furthermore, the address property is not a string, but an object of type "address". The street address object is a "street address" property that contains a street number property of type integer, a street orientation property of type "direction" (that can contain values, W, N, S, or E, or the null set) and a street name property of type string. The town property, state/province property, and country property may be of type string, and the postal code property may be of type integer. Likewise, the view filter 232 may enforce such a view on the object 210 regarding of which code segment access the object through the view filter.

An example of the enforcement of view consistency will now be described. Suppose there is an object O1 and a view filter that offers a view of that object O1. Now suppose the view filter is asked for the type (note: a type is a form of metadata) of the object, and the view filter returns the type T1. Operating over T1, the user might encounter a particular method, which has a return type T2. This type T2 "belongs" to the view filter, too, in the sense that, if the user were to invoke the method and obtain its result, which is an object O2, and ask the view filter for the type of O2, one would get the type T2.

Thus, the principles described herein perform different code segments to have different views on the same object, where those different views may impact the type of the object or the visibility of metadata on that object. This allows objects to be permitted to have any types of metadata that support a wide variety of functionality even though the metadata may be internally inconsistent or may interfere with some functionality if permitted to be visible. The filters may make visible that metadata that is helpful to the code segment requesting the object, and hide the metadata that is not helpful to the code segment. Likewise, the filter provides a typing structure for the object that is suitable and customized for the code segment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a managed code framework, a method of filtering which metadata of an object is returned to a code segment when the code segment has requested the metadata via reflection at runtime, the method comprising:

receiving a request, via reflection, to view metadata of an object, the request being received from a first code segment of an application that is executing within an application domain of a process;

determining a context of the first code segment;

filtering the metadata of the object based on the context of the first code segment so that metadata that is not relevant to the execution of the first code segment is filtered;

returning the filtered metadata to the first code segment to enable the first code segment to customize the execution of the application within the application domain;

receiving a second request, via reflection, to view the metadata of the object, the second request being received from a second code segment of an application that is executing within the application domain;

determining the context of the second code segment, including determining that the context of the second code segment is different than the context of the first code segment;

filtering the metadata of the object based on the context of the second code segment so that metadata that is not relevant to the execution of the second code segment is filtered; and returning the filtered metadata to the second code segment to enable the second code segment to customize the execution of the application within the application domain, wherein the filtered metadata returned to the second code segment is different than the filtered metadata returned to the first code segment.

2. The method of claim 1, wherein determining the context of the first and second code segments comprises matching the context of each code segment to a predefined context used to filter the metadata of the object.

3. The method of claim 1, wherein determining the context of the first and second code segments comprises generating a new context for one or both of the code segments, and using the new context to filter the metadata of the object.

4. The method of claim 1, wherein the first code segment performs functionality for displaying content of the application such that the filtered metadata returned to the first code segment is relevant to displaying the object.

5. The method of claim 1, wherein the second code segment performs functionality for serializing content of the application such that the filtered metadata returned to the second code segment is relevant to serializing the object.

6. The method of claim 1, wherein the filtered metadata returned to the first object includes a string for a first property of the object whereas the filtered metadata returned to the second object includes an object for the first property of the object.

7. The method of claim 1, wherein the filtered metadata returned to the first object includes metadata that is not included in the filtered metadata returned to the second object.

8. The method of claim 1, wherein the metadata of the object includes different pieces of metadata that are inconsistent with each other, and wherein filtering the metadata comprises selecting only one of the inconsistent pieces of metadata to be included in the filtered metadata to be returned to the first or second code segment based on the context of the first or second code segment respectively.

9. The method of claim 1, wherein the filtered metadata returned to either the first or second code segment includes a typing structure of the object that is filtered based on the context of the first or second code segment respectively.

10. A computer program product comprising one or more computer storage media storing computer executable instructions which when executed in a managed code framework, perform a method of filtering which metadata of an object is returned to a code segment when the code segment has requested the metadata via reflection at runtime, the method comprising:

receiving a request, via reflection, to view metadata of an object, the request being received from a first code segment of an application that is executing within an application domain of a process;

determining a context of the first code segment;

filtering the metadata of the object based on the context of the first code segment so that metadata that is not relevant to the execution of the first code segment is filtered;

returning the filtered metadata to the first code segment to enable the first code segment to customize the execution of the application within the application domain;

receiving a second request, via reflection, to view the metadata of the object, the second request being received from a second code segment of an application that is executing within the application domain;

determining the context of the second code segment, including determining that the context of the second code segment is different than the context of the first code segment;

filtering the metadata of the object based on the context of the second code segment so that metadata that is not relevant to the execution of the second code segment is filtered; and returning the filtered metadata to the second code segment to enable the second code segment to customize the execution of the application within the application domain, wherein the filtered metadata returned to the second code segment is different than the filtered metadata returned to the first code segment.

11. The computer program product of claim 10, wherein determining the context of the first and second code segments comprises matching the context of each code segment to a predefined context used to filter the metadata of the object.

12. The computer program product of claim 10, wherein determining the context of the first and second code segments comprises generating a new context for one or both of the code segments, and using the new context to filter the metadata of the object.

13. The computer program product of claim 10, wherein the first code segment performs functionality for displaying content of the application such that the filtered metadata returned to the first code segment is relevant to displaying the object.

14. The computer program product of claim 10, wherein the second code segment performs functionality for serializing content of the application such that the filtered metadata returned to the second code segment is relevant to serializing the object.

15. The computer program product of claim 10, wherein the filtered metadata returned to the first object includes a string for a first property of the object whereas the filtered metadata returned to the second object includes an object for the first property of the object.

16. The computer program product of claim 10, wherein the filtered metadata returned to the first object includes metadata that is not included in the filtered metadata returned to the second object.

17. The computer program product of claim 10, wherein the metadata of the object includes different pieces of metadata that are inconsistent with each other, and wherein filtering the metadata comprises selecting only one of the inconsistent pieces of metadata to be included in the filtered metadata to be returned to the first or second code segment based on the context of the first or second code segment respectively.

18. The computer program product of claim 10, wherein the filtered metadata returned to either the first or second code segment includes a typing structure of the object that is filtered based on the context of the first or second code segment respectively.

* * * * *